(12) United States Patent
Wham et al.

(10) Patent No.: US 12,241,727 B2
(45) Date of Patent: Mar. 4, 2025

(54) MECHANISM FOR SECURING THEN DEPLOYING A ROTATIONALLY COUPLED RIGID MEMBER TO AND FROM A FRAME VIA RETENTION THEN RELEASE OF TENSION IN A CURVED MEMBER

(71) Applicant: Raytheon Company, Arlington, VA (US)

(72) Inventors: Carl J. Wham, Vail, AZ (US); Adora Estelle-Miriam Jackson, Oro Valley, AZ (US)

(73) Assignee: Raytheon Company, Arlington, VA (US)

( * ) Notice: Subject to any disclaimer, the term of this patent is extended or adjusted under 35 U.S.C. 154(b) by 144 days.

(21) Appl. No.: 18/081,287

(22) Filed: Dec. 14, 2022

(65) Prior Publication Data
US 2024/0200916 A1    Jun. 20, 2024

(51) Int. Cl.
*F42B 10/50* (2006.01)
*F42B 10/14* (2006.01)

(52) U.S. Cl.
CPC .............. *F42B 10/50* (2013.01); *F42B 10/14* (2013.01)

(58) Field of Classification Search
CPC ........ F42B 10/50; F42B 10/14; F42B 10/143; F42B 10/146
See application file for complete search history.

(56) References Cited

U.S. PATENT DOCUMENTS

| | | | |
|---|---|---|---|
| 3,114,315 A * | 12/1963 | Trump | F42B 10/146 102/388 |
| 4,834,445 A | 5/1989 | Odegaard | |
| 6,129,181 A | 10/2000 | Weems | |
| 6,397,477 B1 | 6/2002 | Collins | |
| 7,851,733 B2 * | 12/2010 | Geswender | F42B 10/38 244/3.22 |
| 8,540,809 B2 | 9/2013 | Minato et al. | |
| 10,408,090 B2 * | 9/2019 | Propheter-Hinckley | F04D 29/083 |
| 10,429,159 B2 | 10/2019 | Dylla et al. | |
| 11,274,907 B2 | 3/2022 | Merems et al. | |
| 2003/0122293 A1 | 7/2003 | Akhtar et al. | |
| 2006/0059694 A1 | 3/2006 | Carter | |
| 2017/0336148 A1 | 11/2017 | Siegel et al. | |

* cited by examiner

*Primary Examiner* — Richard Green
*Assistant Examiner* — Nevena Aleksic
(74) *Attorney, Agent, or Firm* — Schwegman Lundberg & Woessner, P.A.

(57) ABSTRACT

A mechanism secures and then deploys a rotationally coupled rigid member to and from a frame. One end of a curved member is pinned to the rigid member and the other end is on or in a reaction guiding element. In a closed state, the curved member is straightened from its originally manufactured or "free state" curvature and the other end is secured to the frame via a latch mechanism. The tension in the straightened curved member serves to preload the rigid member against the frame. To move to an open state, the latch mechanism is released allowing the other end of the curved member to move with or within the reaction guiding element along a constrained path towards its free state curvature. The curved member reacts against the frame, the pinned end in the rigid member and the reaction guiding element to rotate the rigid member away from the frame.

18 Claims, 16 Drawing Sheets

MECHANISM FOR SECURING THEN DEPLOYING A ROTATIONALLY COUPLED RIGID MEMBER TO AND FROM A FRAME VIA RETENTION THEN RELEASE OF TENSION IN A CURVED MEMBER

BACKGROUND

Field

This disclosure relates to mechanisms for securing and deploying rotationally coupled rigid members (e.g., covers or aerodynamic surfaces) to and from a frame (e.g., airframes such as missiles, guided projectiles, unmanned aerial vehicles (UAVs), Small Diameter Bombs (SDBs), Miniature Air-Launched Decoys (MALDs) and the like, land/sea/space-based platforms or commercial products).

Description of the Related Art

Mechanisms can be used to secure a rigid member to a frame in a "closed" position or to deploy a rigid member from the frame to an "open" position. In one class, the rigid member is rotationally coupled to a frame at a pivot point. The mechanism preferably preloads the rigid member to secure it against the frame in the closed position. To deploy the rigid member to the open position, the mechanism releases the preload and applies a moment about the pivot point to rotate the rigid member away from the frame.

Airframes such as missiles, guided projectiles, unmanned aerial vehicles (UAVs), Small Diameter Bombs (SDBs), Miniature Air-Launched Decoys (MALDs) and the like need to secure "covers" such as shrouds, fairings, hatches or the like and "aerodynamic surfaces" such as wings, fins, canards or the like both pre-flight and during flight and to deploy the covers or aerodynamic surfaces in flight. In certain systems, the aerodynamic surfaces are stowed in or against the airframe and deployed at launch or in flight. It is critical that such covers or aerodynamic surfaces do not open prematurely (e.g., due to inflight airframe flex) and open quickly and reliably when commanded during flight. In many airframes, the volume available to accommodate the mechanism to secure and deploy the covers or aerodynamic surfaces is limited. A mechanism is positioned within the airframe to secure the surface and then drive the surface into the open position. The mechanism may typically include motor driven gear assemblies, springs, pyrotechnic charges or pistons. See U.S. Pat. Nos. 11,274,907; 8,540,809; 10,429,159 and U.S. Pub. No 2017/0336148.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a mechanism that secures and then deploys a rotationally coupled rigid member to and from a frame such as a cover or aerodynamic surface on an airframe (e.g., missiles, guided projectiles, unmanned aerial vehicles (UAVs), Small Diameter Bombs (SDBs), Miniature Air-Launched Decoys (MALDs) and the like.) One end of a curved member is pinned to the rigid member and the other end of the curved member is on or in a reaction guiding element. In a closed state, the curved member is straightened from its originally manufactured or "free state" curvature and the other end is secured to the frame via a latch mechanism. The tension in the straightened member serves to preload the rigid member against the frame. To move to an open state, the latch mechanism is released allowing the other end of the curved member to move with or within the reaction guiding element along a constrained path towards its free state curvature. The curved member reacts against the frame, the pinned end in the rigid member and the reaction guiding element to produce a moment that rotates the rigid member away from the frame.

In different embodiments, the reaction guiding element may include a slot, a reaction plate or a linkage that both constrain the movement of the released end of the curved member along a path and provide a surface against which the released end reacts to rotate the rigid member away from the frame.

In different embodiments, the latch mechanism can be a one-time mechanism such as a bolt cutter, explosive bolt, frangible bolt, explosive nut, separation nut or pulled pin or a repetitive mechanism such as a manually actuated latch.

In different embodiments, in the closed state the curved member may or may not contact the frame. If the curved member does not contact the frame there is no reaction producing a moment that would lessen the preloading of the rigid member to the frame. If the curved member does contact the frame a reduction in preload will occur but may be outweighed by either the impact shock reducing benefits of such contact upon release of the curved member or a reduced lag in opening the rigid member.

In different embodiments, the curved member is formed from a material such as metal or plastic that can be straightened to store energy in tension without exceeding the material's elastic limit so that when released, the curved member will return to its originally manufactured or free state curvature. High tensile strength components with lower elastic moduli are generally preferred to maximize stored energy when straightened.

In an embodiment, a plurality of curved members can be used in parallel in one mechanism. A plurality of these springs will appear much like a leaf spring stack, but the loads on them will be different to maximize stored energy and deflection. A typical leaf spring may work in this invention but is expected to be suboptimal.

These and other features and advantages of the disclosure will be apparent to those skilled in the art from the following detailed description of preferred embodiments, taken together with the accompanying drawings, in which:

DETAILED DESCRIPTION

Figure 1A:
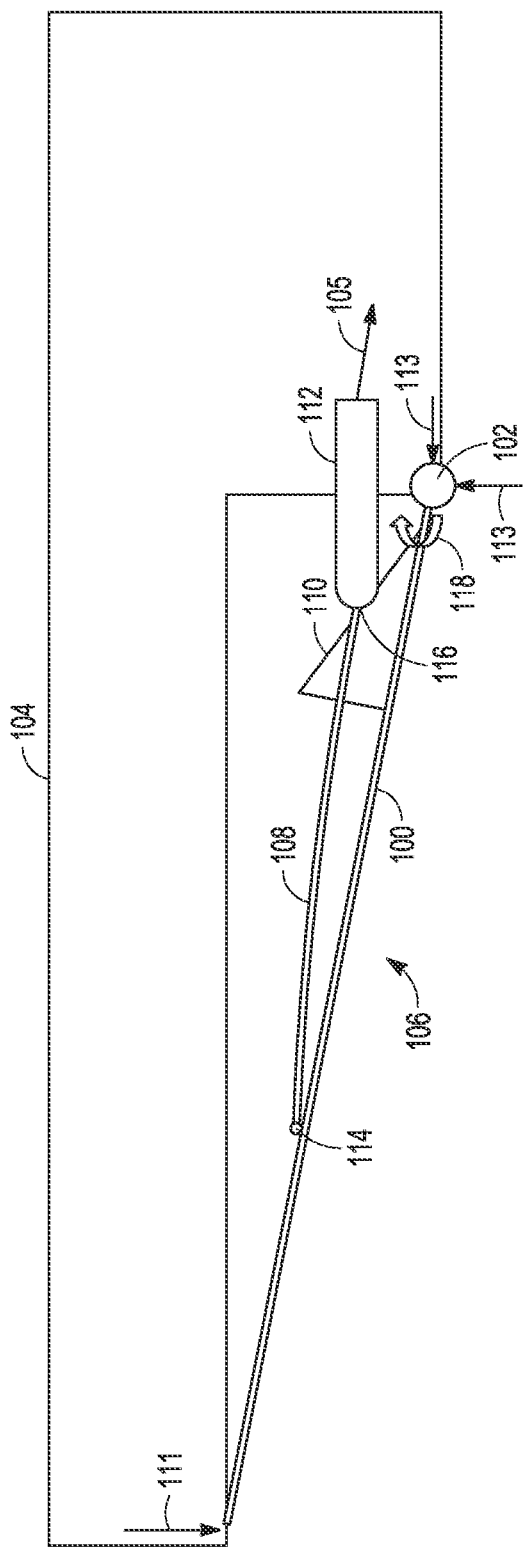
FIGS. 1A-1D illustrate an embodiment of a mechanism for securing and deploying a rotationally coupled rigid member to and from a frame via application and release of tension in a curved member.
Figure 1B:
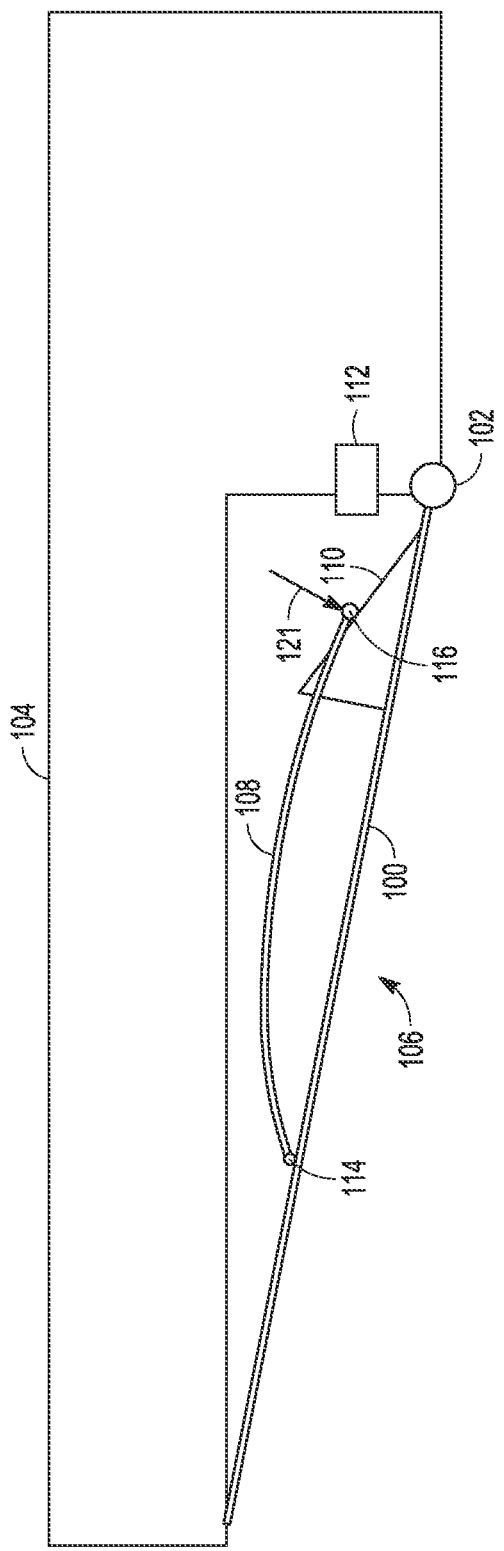
Figure 1C:
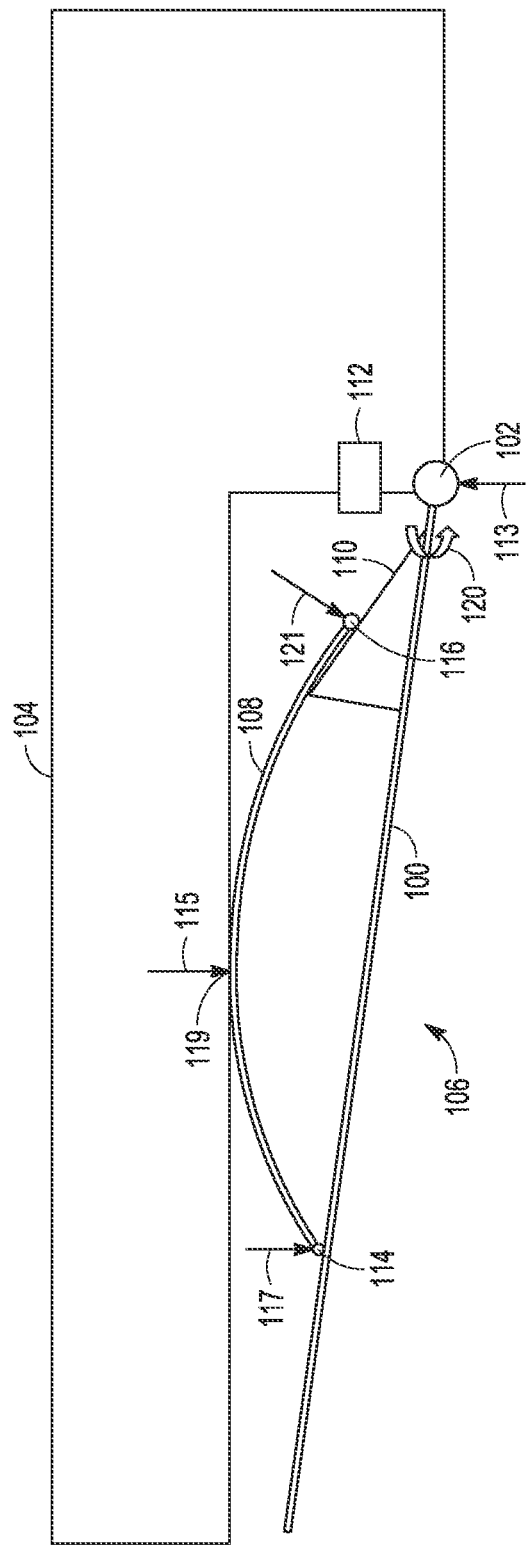
Figure 1D:
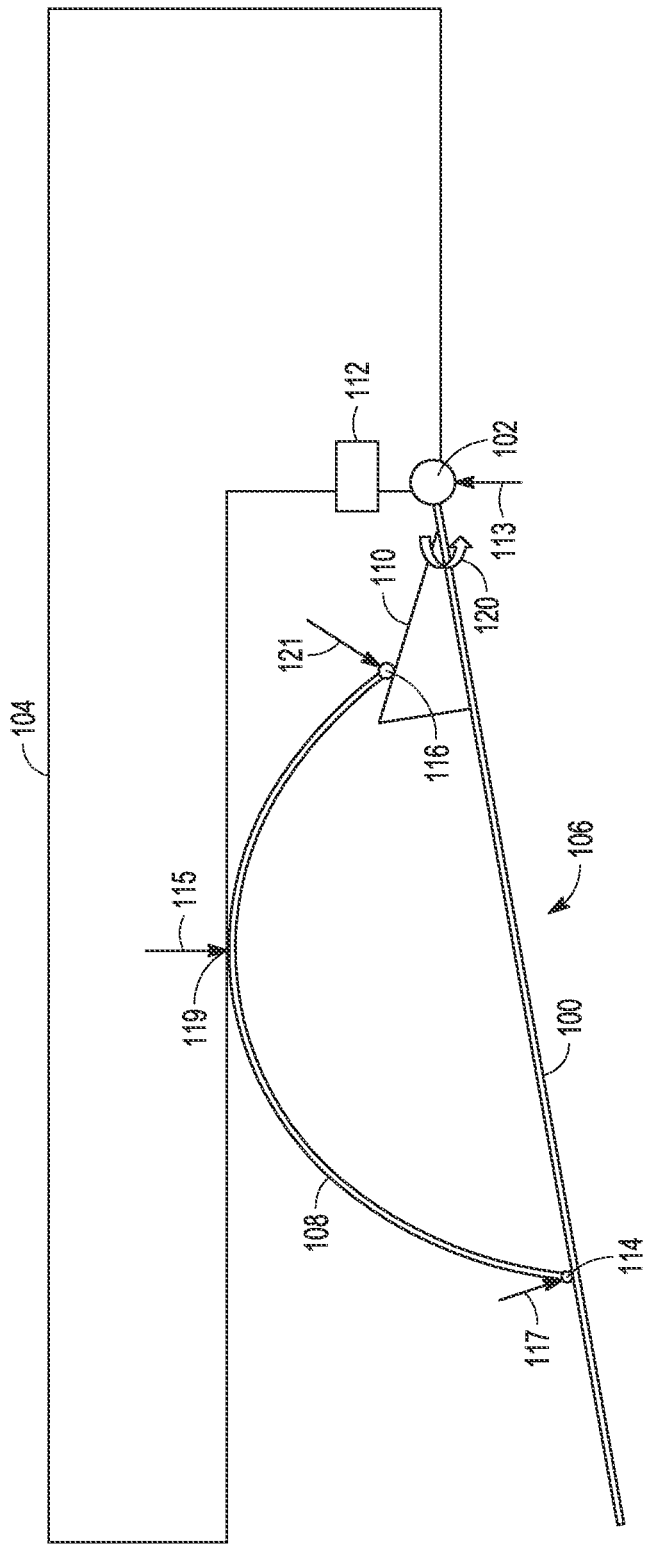

A mechanism secures and then deploys a rotationally coupled rigid member to and from a frame. The mechanism includes a curved member that is "straightened" to produce tension in the member that acts to preload the rigid member against the frame. When the tension is released, the curved member returns towards its original manufactured or "free state" curvature thereby reacting with the frame to rotate the rigid member away from the frame.

The mechanism is generally useful for any application in which a rotationally coupled rigid member needs to be preloaded to secure it against a frame and then forced open to rotate it away from the frame. The rigid member may be a cover such as a shroud, fairing, door or the like or an aerodynamic surface such as a wing, canard, fin or the like. The frame can be an airframe (e.g., missiles, guided projectiles, unmanned aerial vehicles (UAVs), Small Diameter Bombs (SDBs), Miniature Air-Launched Decoys (MALDs) and the like), land/sea/space-based platforms or commercial products. The mechanism may be configured for one-time or repetitive use.

The mechanism is compact and can fit in a constrained space. The mechanism can be easily modified to accommodate changes in either the frame or rigid member geometry. The mechanism generates minimal debris in operation, is easy to manufacture and is highly reliable, having few components and points of failure.

Referring now to FIGS. 1A-1D, a rigid member 100 is configured to rotate about a pivot point 102 on a frame 104. A mechanism 106 is configured to both preload the rigid member 100 to hold it against frame 104 in a closed state and, when commanded, to release the preload and apply a reaction force to rotate the rigid member 100 about pivot point 102 to an open state.

In an embodiment, mechanism 106 includes a curved member 108 that has a non-zero curvature in its originally manufactured or free-state (no stored energy), a reaction guiding element 110 and a latch mechanism 112. Curved member 108 has a first end 114 that is pinned to rigid member 100 at a point offset from pivot point 102 and a second end 116 on or in reaction guiding element 110.

Latch mechanism 112 is configured to initially secure the second end 116 of the curved member 108 on or in the reaction guiding element 110 and to the frame 104. This creates a load 105 at a position offset from the pivot point 102 to put the curved member 108 under tension thereby straightening the curved member 108 to produce a first moment 118 in a rotational direction that preloads the rigid member 100 against the frame 104 in the closed-state. The frame produces a reactive force 111 into rigid member 100 and pivot point 102 produces a pivot reaction 113. Note, "straightening" the curved member 108 does not mean that the curved member 108 becomes straight, merely that it is put under tension to reduce the curvature of curved member 108. As shown, in this embodiment in the closed-state, the curved member 108 does not contact frame 104, instead there is a gap between the curved member 108 and the frame 104. Alternately, curved member 108 could touch the frame 104 having the possible beneficial effects of reducing deployment shock or reducing lag time when released.

Latch mechanism 112 is configured to, when commanded, release the second end 116 of the curved member 108 to allow the second end 116 to move with or within the reaction guiding element 110, along a constrained path, to release tension in the curved member 108 and return the curved member 108 towards its non-zero curvature in the free state. The curved member 108 reacts with the frame 104 at a position 119 offset from the pivot point 102 where the curved member 108 contacts the frame 104 producing a frame force 115 on the curved member 108, reacts with the rigid member 100 at pinned first end 114 producing a reaction load 117, and reacts with a surface of the reaction guiding element 110 at the free second end 116 of the curved member 108 producing a reaction load 121 to produce a second moment 120 in a second rotational direction opposite the first rotational direction to rotate the rigid member 100 about the pivot point 102 away from the frame 104. Curved member 108 must contact frame 104 prior to reaching its free-state such that the curved member 108 retains energy to react with the frame 104.

In the closed-state, the force 105 of the latch mechanism 112 pulling the curved member 108 in one direction, combined with spacing of the pivot point 102 and its reaction force 113 away from the latching force vector 105 causes a couple to form between the two vectors, resulting in the moment 118 that causes the rigid member 100 via the curved member 108 to be pulled against the frame 104 and the frame 104 to have a reactionary force vector 111 against the rigid member 100 resulting in the rigid member 100 being preloaded into the closed position.

To release the rigid member 100 to the open-state, the latch mechanism 112 releases the second end 116 of the curved member 108 allowing the curved member 108 to return towards its free-state, such that the force vector 115 of the frame 104 reacting against the curved member 108, combined with the spacing of the point of contact 119 away from the pivot point 102 and its reaction force 113, results in the moment 120 that is created between the two vectors causing the rigid member 100 to rotate about pivot point 102 and open with respect to frame 104. As the curvature of the curved member 108 increases towards its free state curvature, the rigid member 100 will continue to open.

Reaction guiding element 110 is a feature that provides a constrained path for the second end 116 of the curved member 108 to move on or in once it is released from the latching mechanism 112. As the rigid member 100 is being moved away from the frame 104, the reaction guiding element 110 provides a surface(s) for the curved member 108 to react against. When in combination with the curved member 108 reacting against the rigid member 100 at the first end 114, and the frame 104; the reaction guiding element 110 provides for another area for the curved member 108 to react against to move the rigid member 100 away from the frame 104. It is understood that the reaction guiding element 110 can be attached to the rigid member 100 or to the frame 104. As the stored energy is released from the curved member 108, the freed end 116 will move rapidly as the curved member 108 returns towards its free-state. Controlling the bouncing of the freed end 116 and managing friction along the constrained path will be important considerations in the design. As will be illustrated below, the slot feature allows the greatest tunability by trading a straight slot with various curved options. A reaction plate that moves the curved member away from the frame will simplify the fabrication of the system, but will have a less predictable rebound of the free end of the curved member in operation.

The curved member 108 will have design considerations that are common with spring elements. Spring elements are a way to store energy to perform work in systems; therefore maximizing energy stored is often a major consideration for the design. As such, two key parameters to maximize energy stored in the curved member will be its geometry and its material.

Geometry will be driven to a degree by fabrication approach. It will be manufactured in the curved shape which will be its "free state". Fabrication could involve forming from a bar and bending it into this shape or by machining a carefully selected profile from a plate of material. By choosing machining, the curved member thickness and profile can be tuned to maximize the energy stored within the spring while avoiding yielding or taking a set.

Choosing a material for the curved member is critical to maximize energy stored in the component. A material with a high elastic limit (strength) with lower elastic moduli (stiffness) is preferred to maximize the stored energy. Elastic limit is defined as "the greatest stress that an elastic solid can sustain without undergoing permanent deformation". For airframe components weight is a driving design constraint. Steel and titanium alloys are common choices because the ratio of strength to stiffness is good. Composite materials such as an epoxy resin system with a carbon fiber reinforcement would also work well because the layup can be tuned to increase strength and allow flexing. The weight benefit of the titanium and composite options make them strong candidates for airframe design.

The optimum placement for a curved member is in a volume constrained area that allows for a long narrow mechanism to provide preload for the closure of a rigid member and allows for an expanded volume to move the rigid member into. The curved member works with a hinge or pivot point to help control the path of the rigid member as it is moved away from the frame. The design space allows for the attachment of the curved member to the rigid member at one end, and the attachment of the curved member at the other end to the frame and a reaction guiding element.

The reaction guiding element can be any element that can both restrict the free end of the curved member to follow a constrained path as the curved member returns to its free state and provide a surface against which the free end can react. As will be illustrated, typical reaction guiding elements may be a slot, a linkage or a reaction plate. For clarity, like elements will have the same reference numbers as assigned in FIGS. 1A-1D for the generic reaction guiding element. Elements specific to the embodiment of the reaction guiding element will be assigned new reference numbers.

Figure 2A:
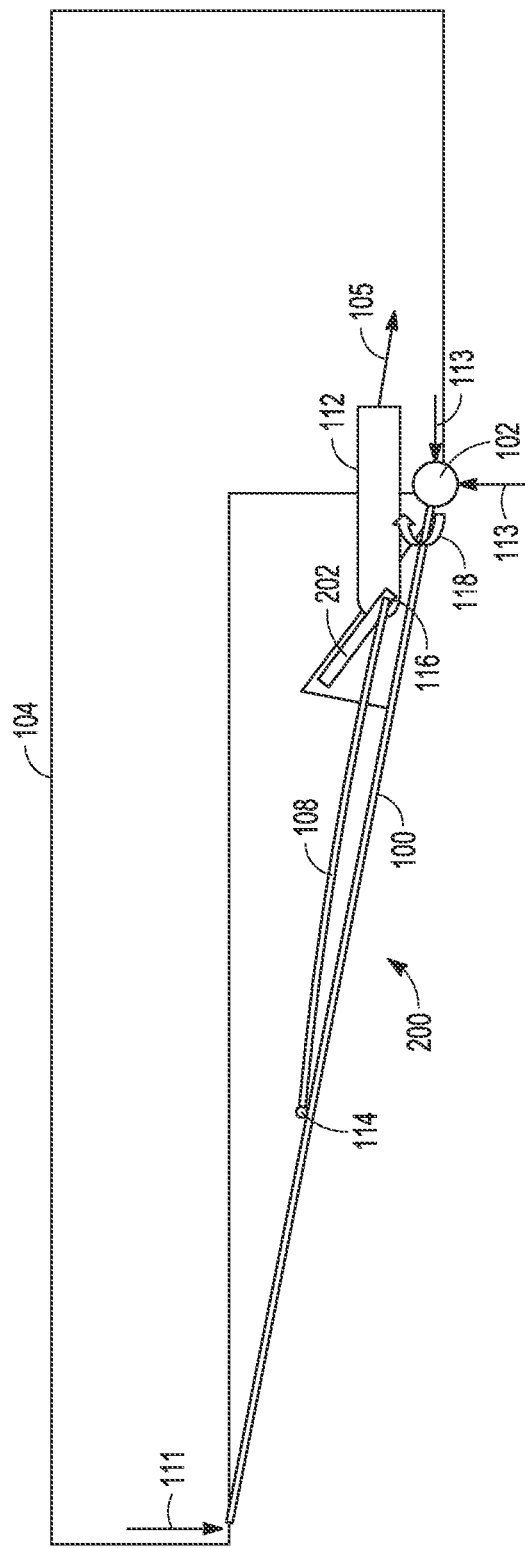
FIGS. 2A-2B illustrate an embodiment of the mechanism in which the reaction guiding element is a slot.
Figure 2B:
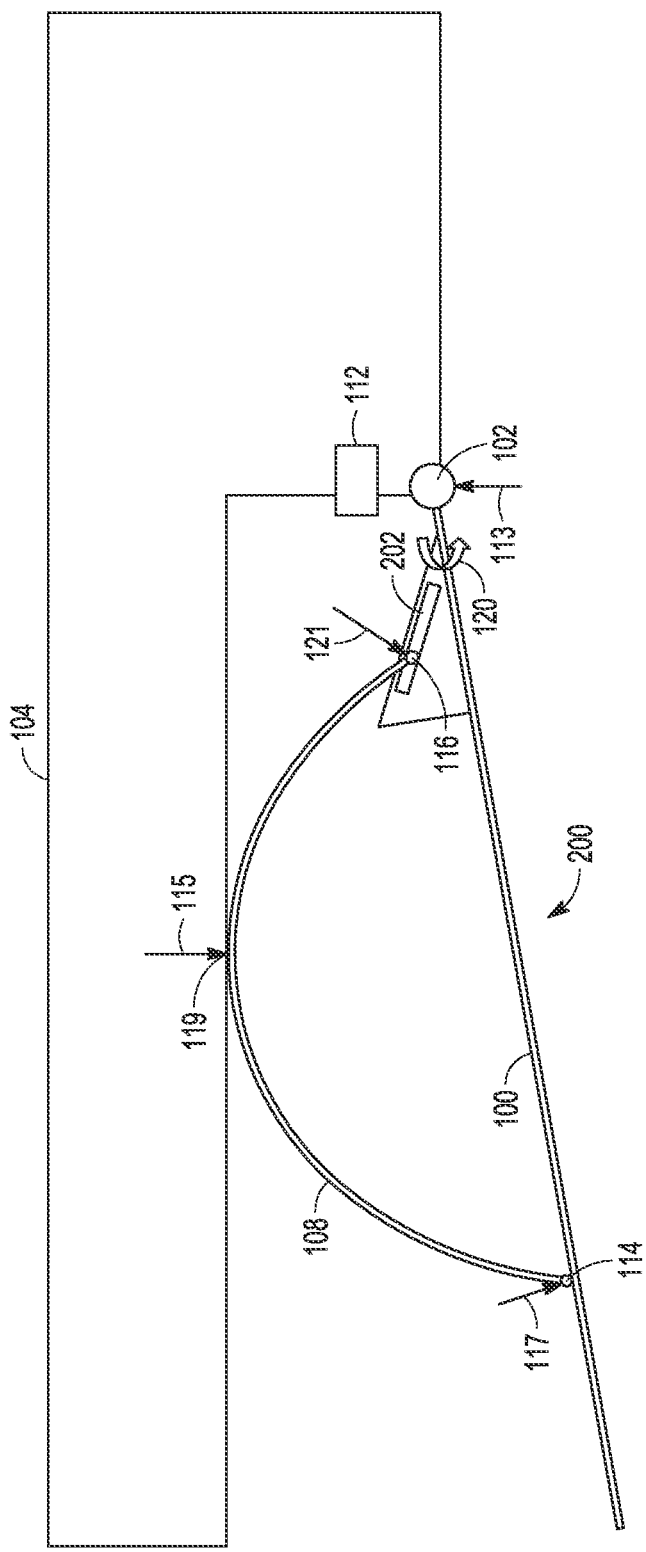

Referring now to FIGS. 2A-2B, a mechanism 200 includes a reaction guiding element in the form of a slot 202 formed on rigid member 100 or alternatively on frame 104. The slot 202 can be formed by either removing material from or adding it to the rigid member 100 (or frame 104). The slot 202 can be linear or curved. It is understood that the slot 202 can be connected to or a part of the rigid member 100 or the frame 104. In the closed-state, the second end 116 of curved member 108 is pinned in one end of slot 202 and attached to frame 104 by locking mechanism 112 with load 105, and the first end 114 of the curved member 108 is pinned to the rigid member 100. This stretches and straightens the curved member 108 that induces a tensile load which stores energy in the straightened member 108. This causes the frame 104 to produce a reactive force 111 into rigid member 100 and pivot point 102 produces a pivot reaction 113. This results in moment 118, causing the rigid member 100 to be preloaded and closed to the frame 104. When latching mechanism 112 is released, the freed or second end 116 of the curved member 108 follows slot 202 along a constrained path. As the curved member 108 returns towards its original curvature and contacts and reacts with frame 104 at point 119 with force 115, the second end 116 of curved member 108 reacts with load 121 against a surface of slot 202 and the rigid member 100 reacts at pivot point 102 with a reactionary force 113. This results in moment 120, which opens the rigid member 100, rotating about pivot point 102, with respect to the frame 104.

Figure 3A:
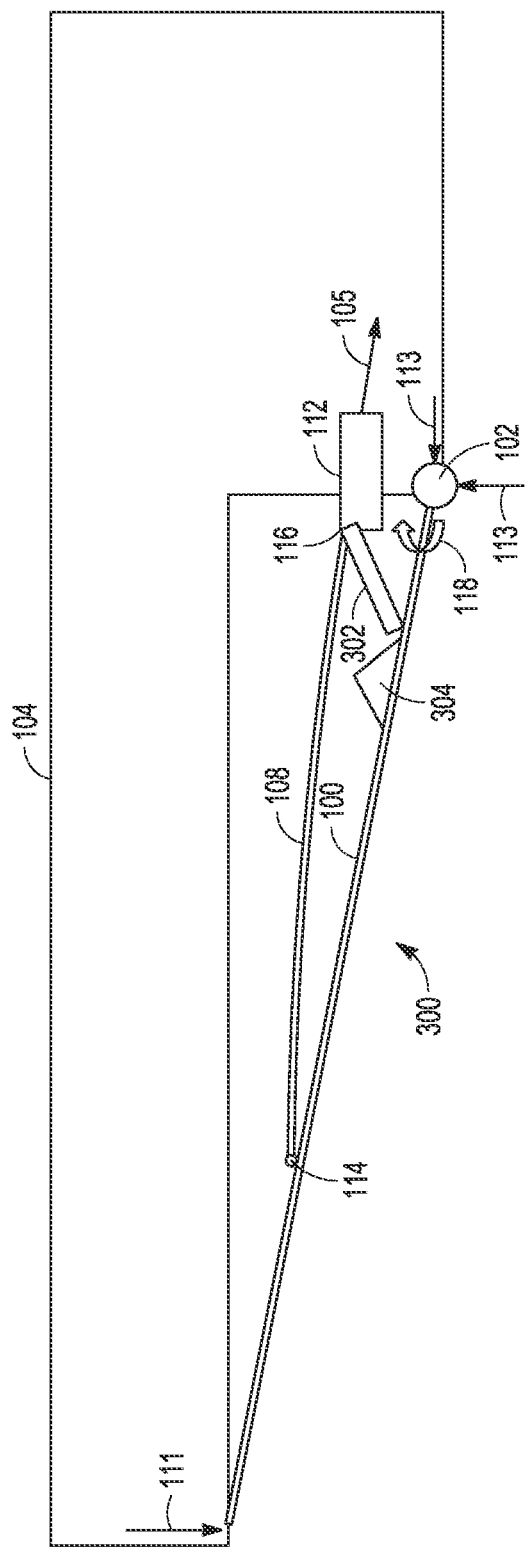
FIGS. 3A-3B illustrate an embodiment of the mechanism in which the reaction guiding element is a linkage.
Figure 3B:
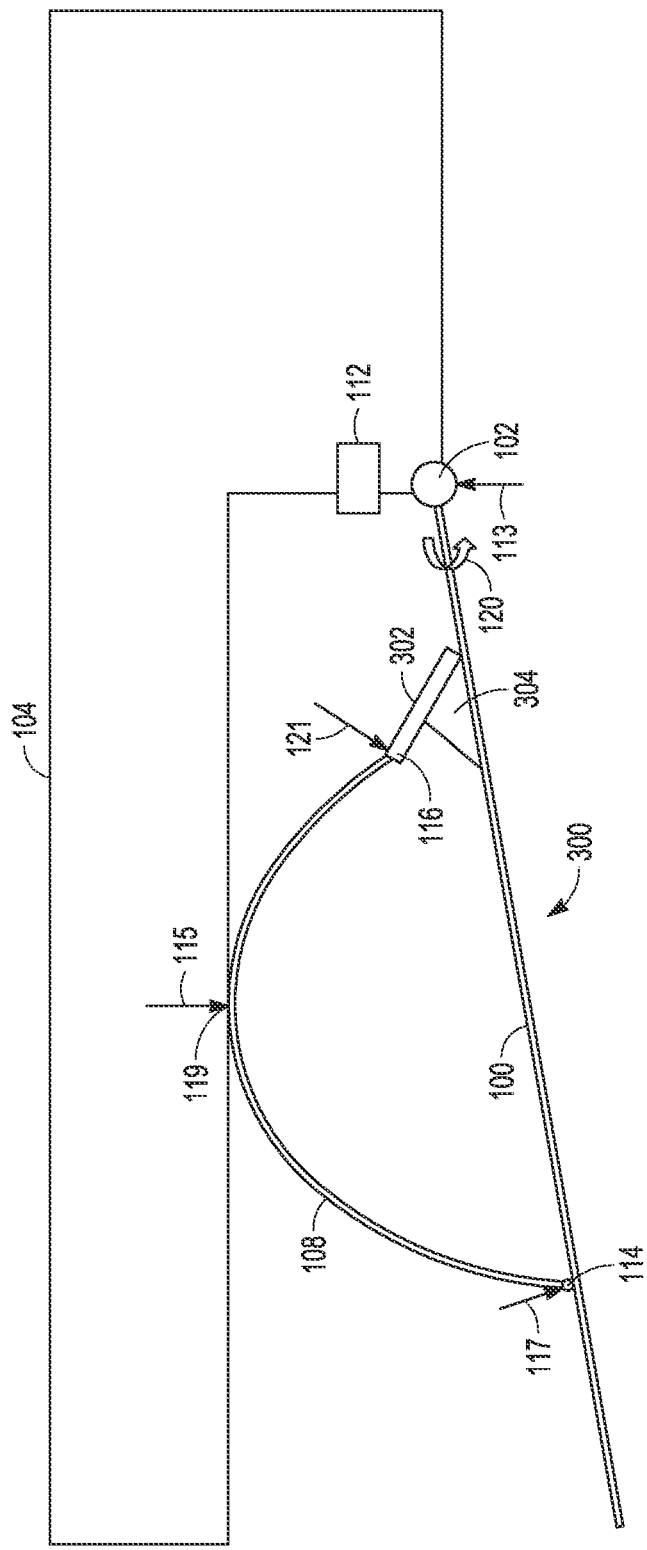

Referring now to FIGS. 3A-3B, a mechanism 300 includes a reaction guiding element in the form of a linkage 302 and a stop 304 formed on rigid member 100 or alternatively on frame 104. Linkage 302 can be any member that joins elements or members together typically with a pinned or multiple pinned ends. The joining areas are typically distanced apart in space. The joining allows for the rotation of the members in one or more directions relative to each other while constraining the path that the member(s) can move on with respect to the other member(s). The second end 116 of curved member 108 is pinned to the free end of linkage 302. In the closed-state, linkage 302 is rotated away from the pinned first end 114 of curved member 108 and secured to frame 104 by locking mechanism 112 with load 105, and the first end 114 of the curved member 108 is pinned to the rigid member 100. This stretches and straightens the curved member 108 that induces a tensile load which stores energy in the straightened member 108. This causes the frame 104 to produce a reactive force 11 into rigid member 100 and pivot point 102 produces a pivot reaction 113. This results in moment 118, causing the rigid member 100 to be preloaded and closed to the frame 104. When latching mechanism 112 is released, curved member 108 releases its stored energy and moves the second end 116 whose path is constrained by linkage 302. As the curved member 108 returns towards its original curvature and contacts and reacts with frame 104 at point 119 with force 115 the second end 116 of curved member 108 reacts with load 121 against linkage 302 and the rigid member 100 reacts at pivot point 102 with a reactionary force 113. This results in moment 120 and linkage 302 rotating until it contacts stop 304 at the open-state of rigid member 100 and opens the rigid member 100, rotating about pivot point 102, with respect to the frame 104.

Figure 4A:
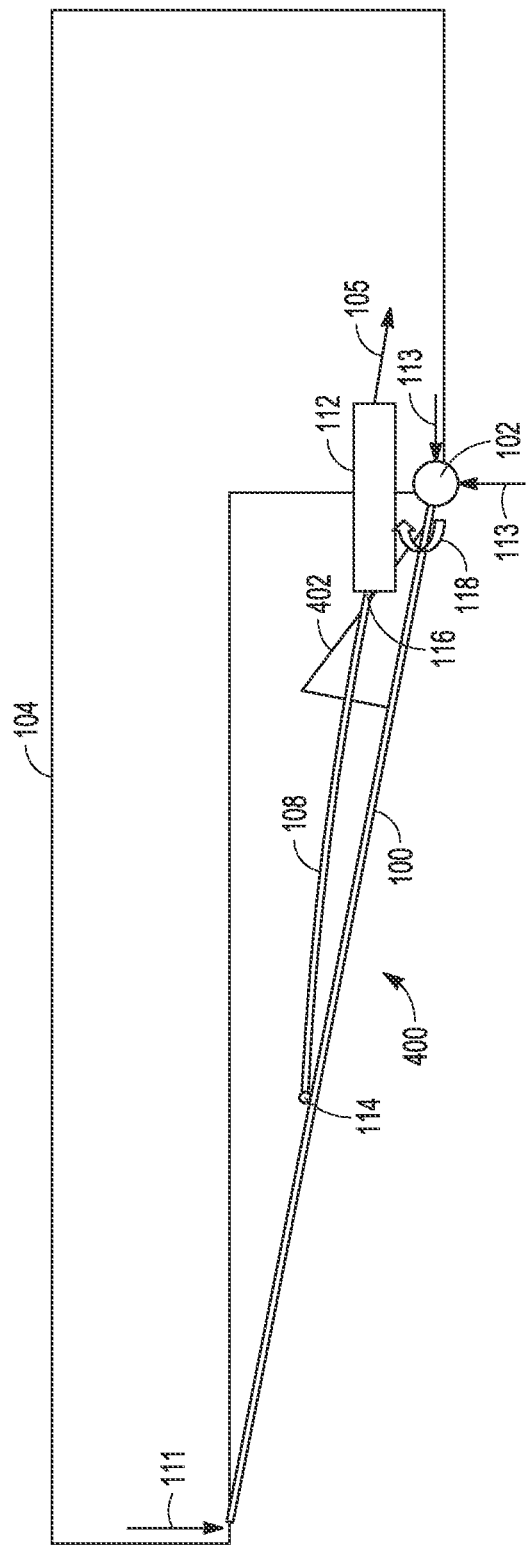
FIGS. 4A-4B illustrate an embodiment of the mechanism in which the reaction guiding element is a reaction plate.
Figure 4B:
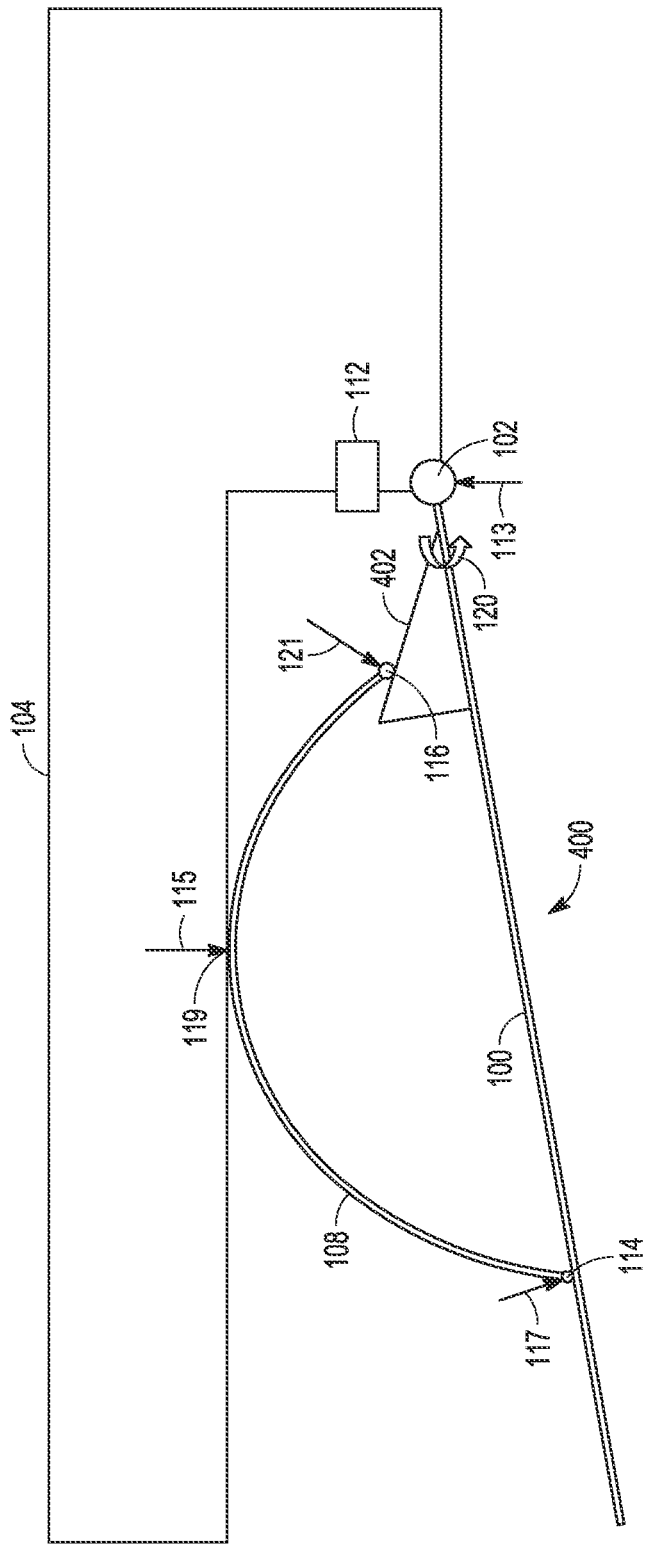
Figure 5:
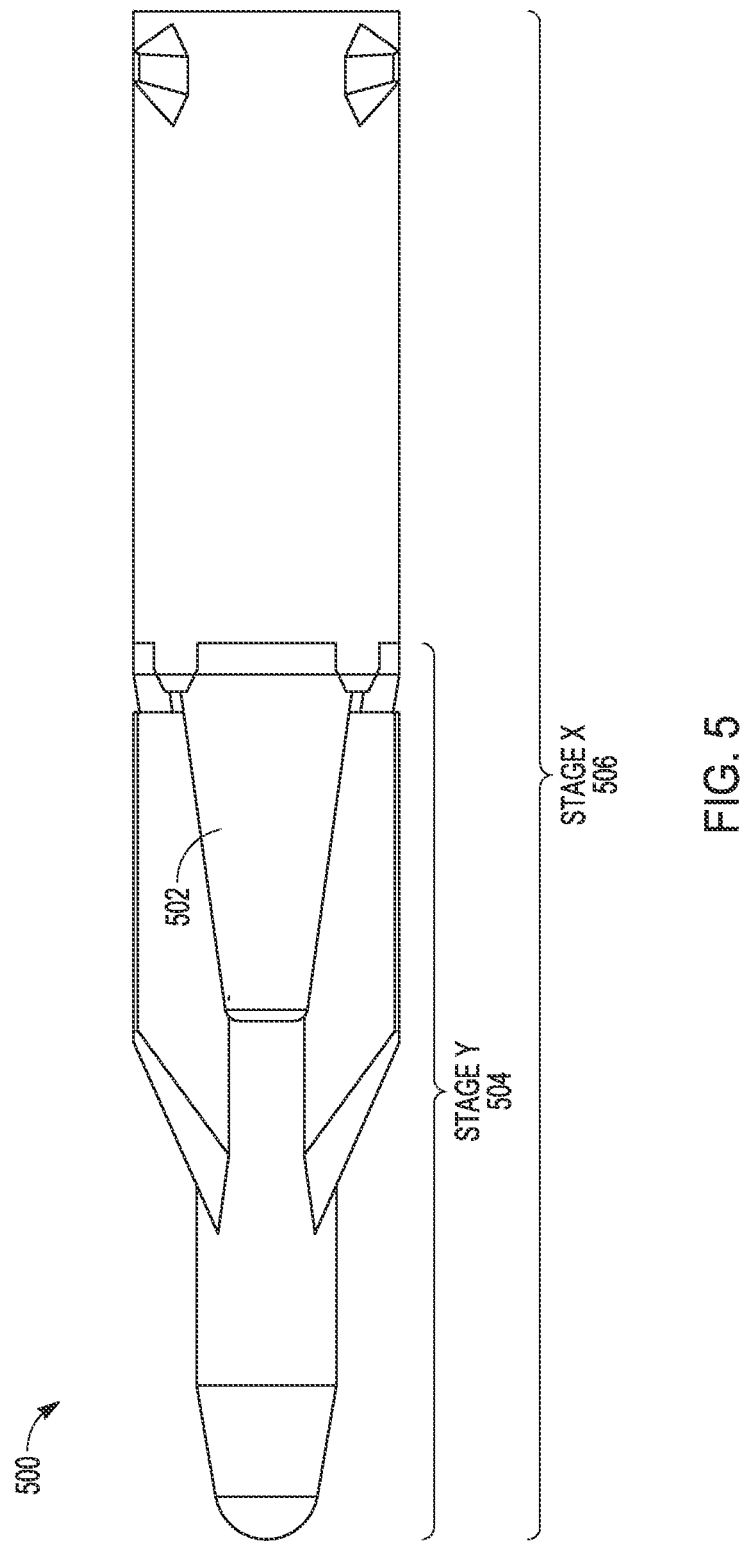
FIG. 5 illustrates an embodiment of a multi-stage missile in which the mechanism is configured to secure a fairing against the missile body during flight and to deploy the fairing at stage separation.
Figure 6A:
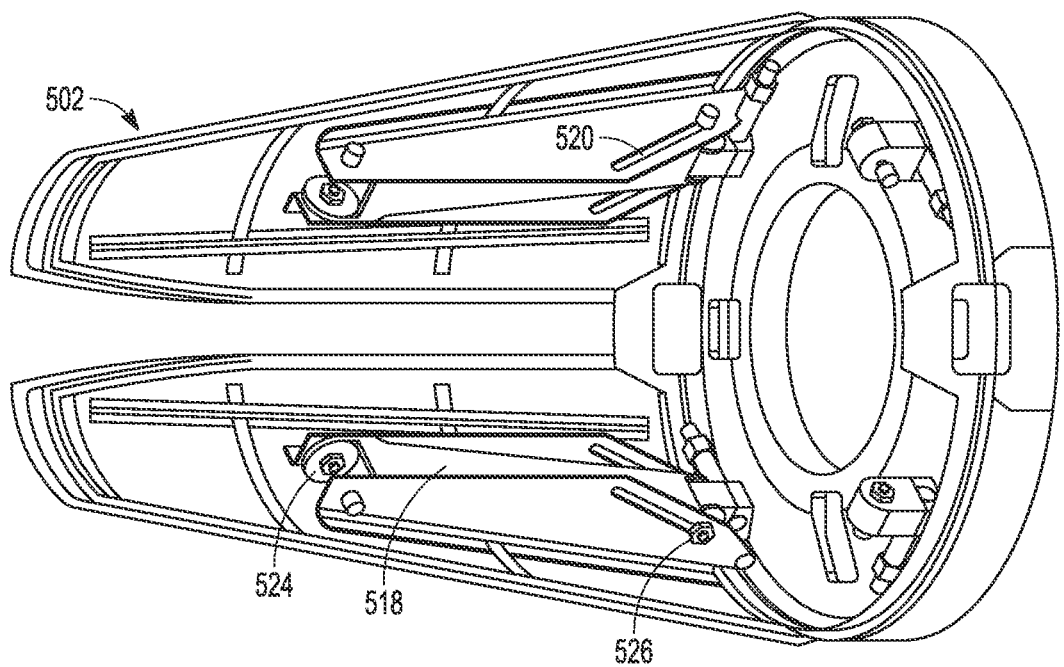
FIGS. 6A-6C and 7A-7C illustrate an embodiment of the mechanism for securing and deploying the fairing to and from the missile body via application and release of tension in a curved member.
Figure 6B:
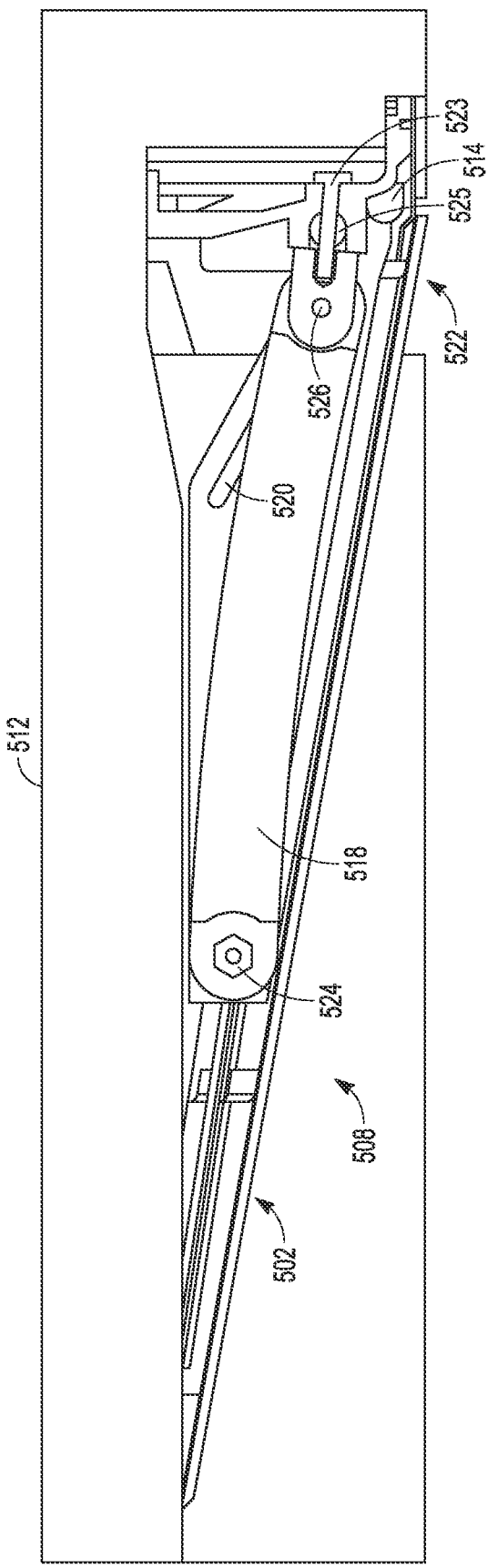
Figure 6C:
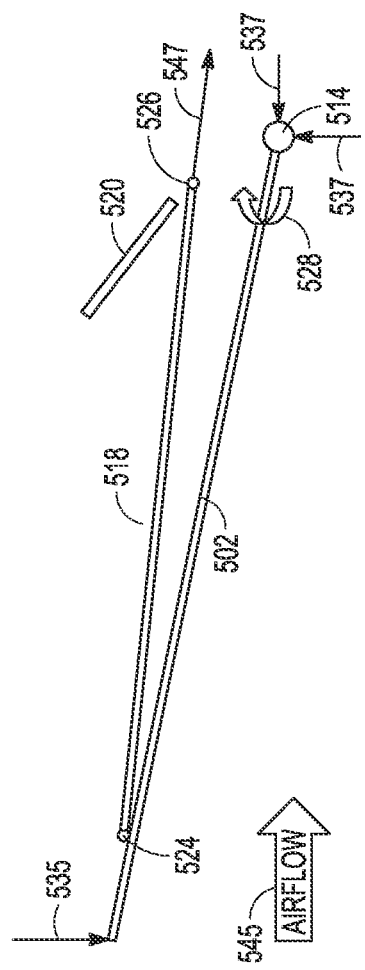
Figure 7A:
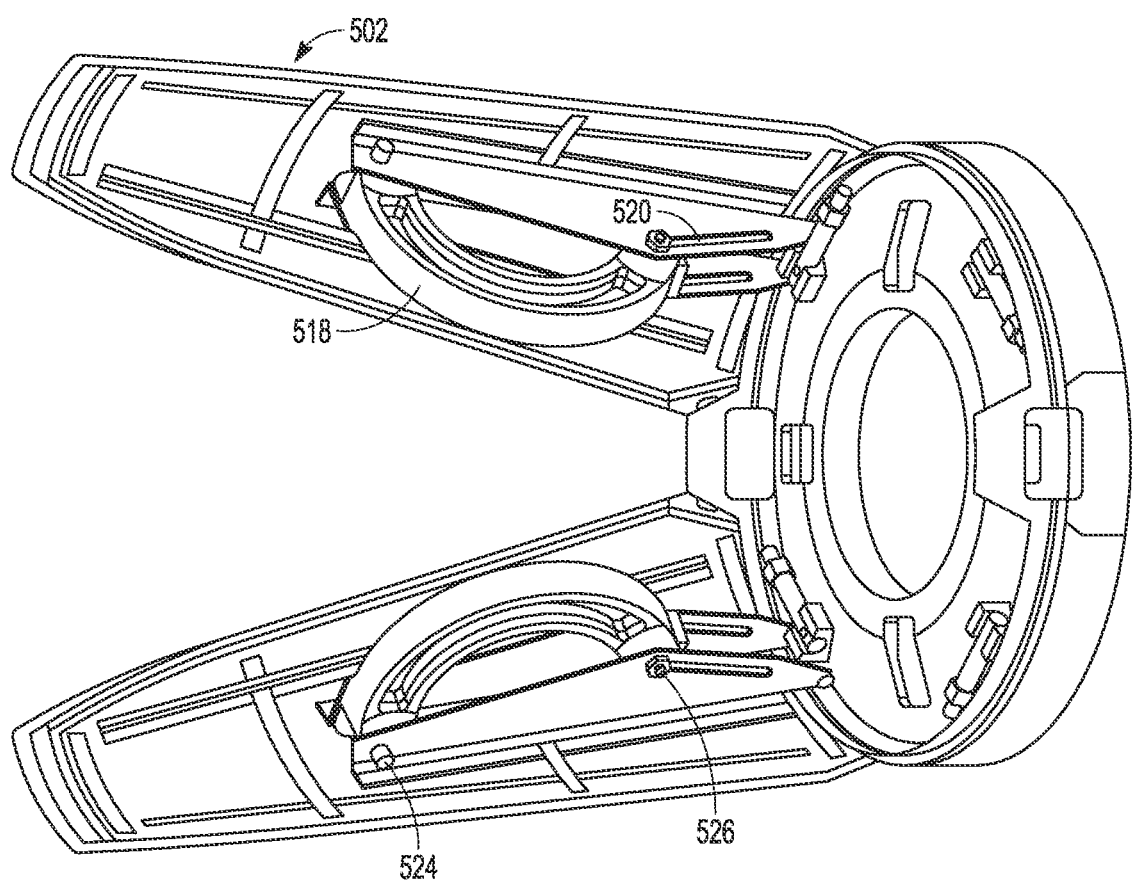
Figure 7B:
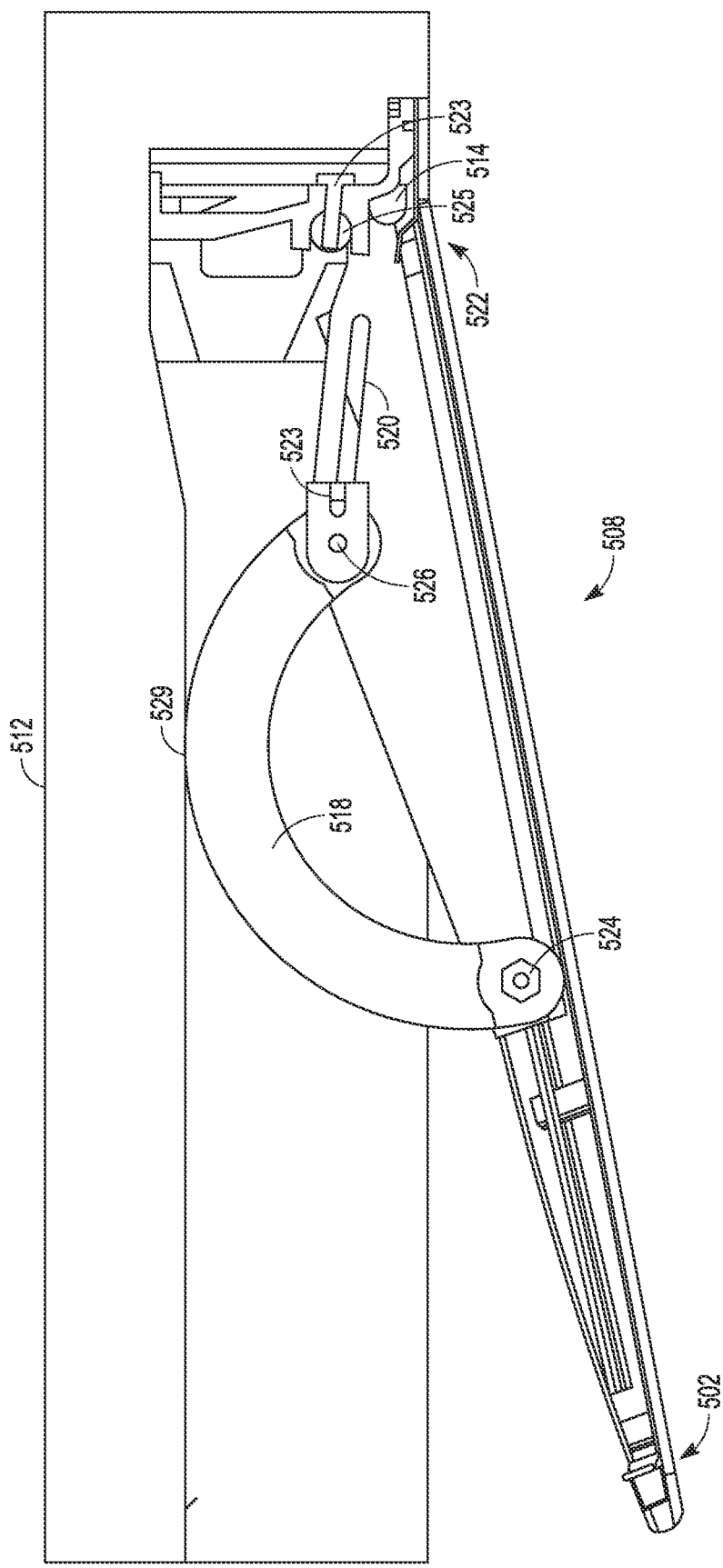
Figure 7C:
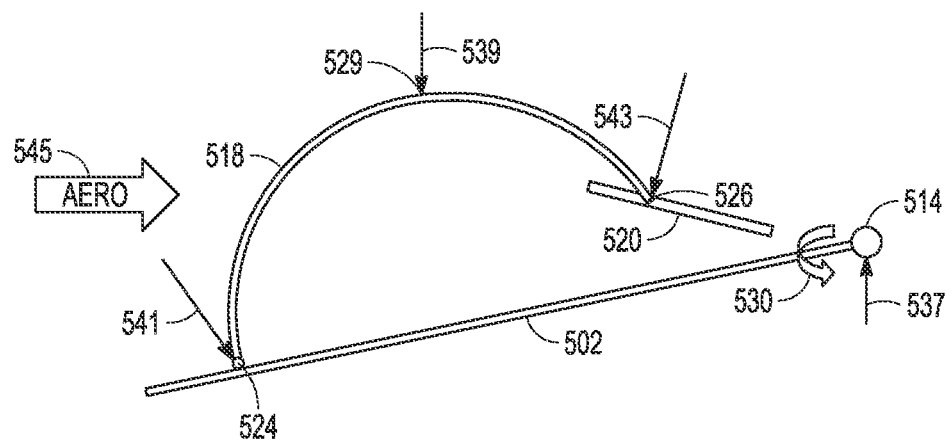

Referring now to FIGS. 4A-4B, a mechanism 400 includes a reaction guiding element in the form of a reaction plate 402 formed on rigid member 100 or alternatively on frame 104. A reaction plate is a surface, flat or not flat, that allows for any member to push against it. It provides a reactionary force in one or more directions and does not typically restrain rotation of the member(s) reacting against it. In the closed-state, the second end 116 of curved member 108 is held against reaction plate 402 and attached to frame 104 by locking mechanism 112 with load 105, and the first end 114 of the curved member 108 is pinned to the rigid member 100. This stretches and straightens the curved member 108 that induces a tensile load which stores energy in the straightened member 108. This causes the frame 104 to produce a reactive force 111 into rigid member 100 and pivot point 102 produces a pivot reaction 113. This results in moment 118, causing the rigid member 100 to be preloaded and closed to the frame 104. When latching mechanism 112 is released, the freed or second end 116 of the curved member 108 reacts against the reaction plate 402 along a constrained path. As the curved member 108 returns towards its original curvature and contacts and reacts with frame 104 at point 119 with force 115 the second end of curved member 108 reacts with load 121 against the surface of reaction plate 402 and the rigid member 100 reacts at pivot point 102 with a reactionary force 113. This results in moment 120, which opens the rigid member 100, rotating about pivot point 102, with respect to the frame 104.

Referring now to FIGS. 5, 6A-6C and 7A-7C, a multi-stage missile 500 is provided with four fairings 502 to reduce aerodynamic drag where Stage Y 504 separates from Stage X 506. A mechanism 508 of the type previously described including a slot 520 as the reaction guiding feature is configured to preload each fairing 502 against airframe 512 in a closed-state and when commanded to rotate fairing 502 about pivot point 514 away from the airframe 512. Each of the four fairings 502 may remain attached to the previous stage 506 or be jettisoned separately from the stage 506.

In an embodiment, mechanism 508 includes a curved member 518 that has a non-zero curvature in its originally manufactured or free-state (no stored energy), a reaction guiding element in the form of a slot 520 and a latch mechanism 522 such as a bolt cutter, explosive bolt, frangible bolt, explosive nut, separation nut or pulled pin. Curved member 518 has a first end 524 that is pinned to fairing 502 at a point offset from pivot point 514 and a second end 526 in slot 520.

Latch mechanism 522 is configured to initially secure the second end 526 of the curved member 518 at one end of slot 520 and to the airframe 512 at a position offset from the pivot point 514 to put the curved member 518 under tension thereby straightening the curved member 518 to produce a first moment 528 in a rotational direction that preloads the fairing 502 against the airframe 512 in the closed-state. The airframe produces a reactionary force 535 into fairing 502 and pivot point 514 produces a pivot reaction 537. In this example, latch mechanism 522 includes a tension bolt 523 that secures second end 526 to airframe 512 and a bolt cutter 525. Note, "straightening" the curved member does not mean that the curved member becomes straight, merely that it is put under tension to reduce the curvature of the member. As shown, in this embodiment in the closed-state, the curved member 518 does not contact frame 512, instead there is a gap between curved member 518 and the frame 512. Alternately, curved member 518 could touch the frame 512 having the possible beneficial effects of absorbing shock or reducing lag time when released.

Latch mechanism 522 is configured to, when commanded, cause the bolt cutter 525 to break the tension bolt 523 which releases the second end 526 of the curved member 518 to allow the second end 526 to move within slot 520, along a constrained path, to release tension in the curved member 518 and allow the return of the curved member 518 towards its non-zero curvature in the free state. The fairing 502 reacts with a reactionary load 537 at pivot point 514 and the curved member 518 reacts with airframe 512 at a position 529 offset from the pivot point 514, where the curved member 518 contacts the airframe 512 producing a frame reactionary force 539 on the curved member 518, reacts with the fairing 502 at the pinned first end 524 producing a reaction load 541 and reacts with a surface of slot 520 at free second end 526 producing a reaction load 543 to produce a second moment 530 in a second rotational direction opposite the rotational direction of the first moment 528 to rotate the fairing 502 about the pivot point 514 away from the airframe 512. Curved member 518 must contact airframe 512 prior to reaching its free-state such that the curved member 518 retains energy to react with the frame 512. In flight, once fairing 502 is opened to form a gap between the fairing and airframe 512, airflow 545 will increase the rotational moment to fully open fairing 502.

In the closed-state, the force of the latch mechanism 522 pulling the curved member 518 in one direction, combined with spacing of the pivot point 514 and its reactionary loads 537 away from a latching force vector 547 causes a couple to form between the two vectors, resulting in the moment 528 that causes the fairing 502 via the curved member 518 to be pulled against the airframe 512 and the airframe 512 to react against the fairing 502 with a reactionary load 535 resulting in the fairing 502 being preloaded into the closed position. Preloading the fairing 502 can mitigate gapping problems due to bending or flexure of the airframe 512 in flight that could prematurely open the fairing 502.

To release the fairing 502 to the open-state, the force vector 539 of the airframe 512 reacting against the curved member 518, combined with the spacing of the point of contact 529 away from the pivot point 514 and reactionary force vector 537, results in force vectors that form a moment 530 between the two vectors causing the fairing 502 to rotate and open with respect to the airframe 512. As the curvature of the curved member 518 increases, the fairing 502 will continue to open with respect to the airframe 512.

Figure 8:
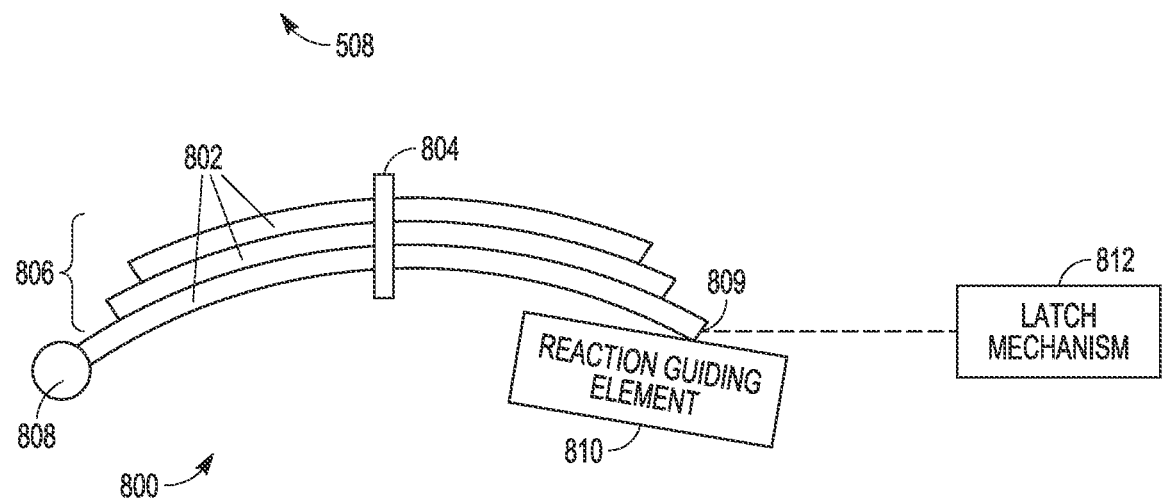
FIG. 8 illustrates an embodiment of the mechanism in which multiple curved members are stacked in parallel.

Referring now to FIG. 8, in an embodiment a mechanism 800 may include a plurality of curved members 802 that are laminated to form a set of parallel curved members. Each curved member 802 is suitably the same material and thickness or varying materials and thicknesses. The curved members 802 are joined together by hardware(s) 804 to form a single curved member 806. One end 808 of the curved member set, suitably the longest or "main" curved member, is pinned to the rigid member and the other end 809 of the curved member set is in or on a reaction guiding element 810 and coupled via latch mechanism 812 to the frame. A single curved member will have a maximum allowable deflection of "X" and result in a stored energy of "Y". This maximum deflection will be defined by taking the curved member material up to its maximum bending limit while not exceeding its elastic limit. Once the elastic limit is exceeded the energy is not stored but transfers into heat and plastic (permanent) deformation. If 4 curved members are employed in a parallel stack the deflection will be "X" still, but the stored energy will be 4 X Y because the integrated force will be four times greater.

With a single curved member 4 times the thickness the allowable deflection will be far less because the increased moment of inertia increases by a cube of the thickness. This reduction in deflection may not be desirable for the operation of the system. Tuning the force profile over the spring deflection will provide the design space to optimally tune said system. A single high spring rate curved member may be more or less desirable for the application versus a softer spring comprised of multiple springs with greater deflection.

The force vectors illustrated in the Figures are for illustrative purposes and may in alternate embodiments act in a different or opposite direction than shown. It is assumed that some vectors shown may be 'negative' vectors depending on the application and geometry of the applied embodiment.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A mechanism for securing and deploying a rigid member to and from a frame, said rigid member configured to rotate about a pivot point on the frame, wherein the frame is an airframe and the rigid member is a cover or aerodynamic surface, said mechanism comprising:
a reaction guiding element;
a curved member having a first end pinned to the rigid member and spaced apart from the pivot point and a second end on or in the reaction guiding element, said curved member having a non-zero curvature in a free state; and
a latch mechanism, said latch mechanism configured to (a) initially secure the second end of the curved member on or in the reaction guiding element and to the frame at a position offset from the pivot point to put the curved member under tension thereby straightening the curved member to produce a first moment in a rotational direction that preloads the rigid member against the frame and to (b) release the second end of the curved member to allow the second end to move with or within the reaction guiding element, along a constrained path, to release tension in the curved member and allow the return of the curved member towards its non-zero curvature in the free state, such that the curved member reacts with the frame at a position offset from the pivot point, where the curved member contacts the frame and reacts with the rigid member and a surface of the reaction guiding element at the first and second ends of the curved member, respectively, to produce a second moment in a second rotational direction opposite the first rotational direction to rotate the rigid member about the pivot point away from the frame.

2. The mechanism of claim 1, wherein the curved member is formed from a metal, plastic or composite material exhibiting an elastic limit and an elastic moduli such that the straightening of the curved member allows for the return of the curved member towards its free state shape.

3. The mechanism of claim 1, wherein the reaction guiding element includes one of a slot or a reaction plate within or against which the second end of the curved member moves or a linkage with which the second end of the curved member moves towards its non-zero curvature in the free state.

4. The mechanism of claim 1, wherein the latch mechanism includes one of a bolt cutter, explosive bolt, frangible bolt, explosive nut, separation nut, or pulled pin to provide a one-time release of the curved member.

5. The mechanism of claim 1, wherein the curved member contacts the frame when the second end of the curved member is secured.

6. The mechanism of claim 1, wherein a gap exists between the curved member and the frame when the second end of the curved member is secured.

7. The mechanism of claim 1, wherein a plurality of curved members are laminated to form the curved member.

8. A mechanism for securing and deploying a rigid member to and from a frame, said rigid member configured to rotate about a pivot point on the frame, wherein the frame is an airframe and the rigid member is a cover or aerodynamic surface, said mechanism comprising:
a reaction guiding element;
a curved member having a first end pinned to the rigid member and a second end on or in the reaction guiding element, said curved member having a non-zero curvature in a free state; and
a latch mechanism, said latch mechanism configured to (a) initially secure the second end of the curved member on or in the reaction guiding element and to the frame to put the curved member under tension to preload the rigid member against the frame and to (b) release the second end of the curved member to allow the second end to move with or within the reaction guiding element along a constrained path to release tension in the curved member such that the curved member contacts and reacts with the frame, the rigid member and a surface of the reaction guiding element to rotate the rigid member about the pivot point away from the frame.

9. The mechanism of claim 8, wherein the reaction guiding element includes one of a slot or a reaction plate within or against which the second end of the curved member moves or a linkage with which the second end of the curved member moves towards its non-zero curvature in the free state.

10. The mechanism of claim 8, wherein the curved member contacts the frame when the second end of the curved member is secured.

11. The mechanism of claim 8, wherein a gap exists between the curved member and the frame when the second end of the curved member is secured.

12. The mechanism of claim 8, wherein a plurality of curved members are laminated to form the curved member set.

13. A system comprising:
an airframe;
a cover or aerodynamic surface mechanically coupled to rotate about a pivot point on the airframe;
a reaction guiding element;
a curved member having a first end pinned to the cover and spaced apart from the pivot point and a second end on or in the reaction guiding element, said curved member having a non-zero curvature in a free state; and
a latch mechanism, said latch mechanism configured to (a) initially secure the second end of the curved member on or in the reaction guiding element and to the frame at a position offset from the pivot point to put the curved member under tension thereby straightening the curved member to produce a first moment in a rotational direction that preloads the cover or aerodynamic surface against the airframe and to (b) release the second end of the curved member to allow the second end to move with or within the reaction guiding element along a constrained path to release tension in the curved member and return the curved member towards its non-zero curvature in the free state such that the curved member reacts with the airframe at a position offset from the pivot point where the curved member contacts the airframe and reacts with the cover and a surface of the reaction guiding element at the first and second ends of the curved member, respectively, to produce a second moment in a second rotational direction opposite the first rotational direction to rotate the cover or aerodynamic surface about the pivot point away from the airframe.

14. The system of claim 13, wherein the latch mechanism includes one of a bolt cutter, explosive bolt, frangible bolt, explosive nut, separation nut or pulled pin to provide a one-time release of the curved member.

15. The system of claim 13, wherein the reaction guiding element includes one of a slot or a reaction plate within or against which the second end of the curved member moves or a linkage with which the second end of the curved member moves towards its non-zero curvature in the free state.

16. The system of claim 13, wherein the curved member contacts the airframe when the second end of the curved member is secured.

17. The system of claim 13, wherein a gap exists between the curved member and the airframe when the second end of the curved member is secured.

18. The system of claim 13, wherein a plurality of curved members are employed in parallel to form the curved member.

\* \* \* \* \*

UNITED STATES PATENT AND TRADEMARK OFFICE
CERTIFICATE OF CORRECTION

PATENT NO. : 12,241,727 B2
APPLICATION NO. : 18/081287
DATED : March 4, 2025
INVENTOR(S) : Wham et al.

It is certified that error appears in the above-identified patent and that said Letters Patent is hereby corrected as shown below:

In the Specification

In Column 6, Line 33, delete "11" and insert --111-- therefor

Signed and Sealed this
Twenty-seventh Day of May, 2025

Coke Morgan Stewart
*Acting Director of the United States Patent and Trademark Office*